Patented Nov. 13, 1923.

1,474,140

UNITED STATES PATENT OFFICE.

HENRY J. BROWN, OF CLEVELAND, OHIO.

MEDICINAL PREPARATION.

No Drawing.  Application filed February 10, 1921.  Serial No. 443,895.

*To all whom it may concern:*

Be it known that I, HENRY J. BROWN, a citizen of the United States, residing at Cleveland, in the county of Cuyahoga and State of Ohio, have invented a certain new and useful Improvement in Medicinal Preparation, of which the following is a full, clear, and exact description.

This invention relates to a composition of matter designed to be used as a medical preparation for the alleviation of the physiological effects of nicotine. The objects of the invention are the provision of a preparation which shall be simple and inexpensive to prepare; harmless and non-poisonous to children or others who may consume it accidentally; pleasant and agreeable to take and beneficial in general physical properties; and, above all, which shall minimize the injurious effects of nicotine upon the body whether caused by over indulgence or by special susceptibility.

The essence of my invention consists in the use of magnesium peroxide for this purpose, mixed with a suitable amount of an energizing agent which is preferably a mild organic acid. A very satisfactory energizing agent is tannic acid because of its mildness, its non-corrosion of the teeth, and its slightly astringent effect. Besides it does not exhibit a premature reaction on the magnesium compound. These two ingredients can appear in a wide diversity of proportions; I have had excellent results with mixtures wherein the tannic acid constituted from about one tenth to one third the amount of the magnesium peroxide, although I do not restrict myself to these proportions.

The preferred dose contains approximately two grains of the magnesium peroxide although less or more can be used since the mixture is not only innocuous but even beneficial to the general health. It may, of course, be administered in powdered form but is preferably mixed with a palatable vehicle such as cocoa-butter, candy, or gum. Thus it may be mixed with sugar and cocoa-butter and made into tablets; it may be incorporated with any kind of candy or sweets; but my preference is to incorporate it into chewing gum by mixing it with chicle in company with any suitable or desired flavor, and in this case I preferably employ such a quantity that each stick of the gum will contain about ½ grain of the magnesium peroxide. The proportion of medicament to chicle may thus depend upon the size of the stick; a convenient size of stick being 7 grains, one can use a proportion of say 1 part medicament to 7 parts more or less of chicle.

It will be understood that I do not limit myself except as set forth in the annexed claims.

Having thus described my invention what I claim is:

1. A medical preparation for internal use containing dry magnesium peroxide mixed with a dry water-soluble organic acid.

2. A dry medicinal preparation for internal use containing magnesium peroxide mixed with tannic acid.

3. A dry medicinal preparation for internal use containing magnesium peroxide mixed with from about one tenth to about one third of its weight of tannic acid.

4. A medicinal preparation for internal use consisting essentially of dry magnesium peroxide and an energizing agent therefor, the whole incorporated in an inactive vehicle and adapted to become active when moistened.

5. A composition of matter for internal use consisting essentially of magnesium peroxide and a dry, water-soluble, organic acid mixed with a water free, masticable vehicle and a flavoring agent.

6. A chewing gum consisting essentially of chicle having incorporated therewith from about one tenth to about one fourth part of magnesium peroxide and a smaller quantity of a dry, water-soluble organic acid.

7. A chewing gum for smoker's use consisting of a chicle base impregnated with a mild inorganic oxidizing agent and an organic energizing agent adapted when moistened to act upon the oxidizing agent with liberation of oxygen.

In testimony whereof, I hereunto affix my signature.

HENRY J. BROWN.